United States Patent [19]

Hanagan

[11] 3,937,291
[45] Feb. 10, 1976

[54] MOTOR MOUNT FOR ELECTRIC POWERED MOTORCYCLE

[75] Inventor: Michael W. Hanagan, Somers, Conn.

[73] Assignee: Corbin Gentry, Inc., Somerville, Conn.

[22] Filed: Oct. 7, 1974

[21] Appl. No.: 512,418

[52] U.S. Cl. .............................. 180/33 A; 180/32
[51] Int. Cl.² ........................................ B62D 61/02
[58] Field of Search ..... 180/29, 30, 32, 33 R, 33 A, 180/34; 280/283, 284

[56] References Cited
UNITED STATES PATENTS

| | | | |
|---|---|---|---|
| 2,275,050 | 3/1942 | Lewis | 180/32 |
| 2,604,179 | 7/1952 | Gilardi | 280/284 X |
| 3,631,936 | 1/1972 | Schiveser | 180/32 |
| 3,773,131 | 11/1973 | Jaulmes | 180/33 A X |
| 3,817,342 | 6/1974 | Hamilton | 180/32 |

FOREIGN PATENTS OR APPLICATIONS

| | | | |
|---|---|---|---|
| 1,083,259 | 1/1955 | France | 180/33 A |

*Primary Examiner*—Kenneth M. Betts
*Assistant Examiner*—R. Schrecengost

[57] ABSTRACT

A motor mount assembly is provided which is particularly adapted for employment in an electric powered motorcycle for mounting the motor thereof thereon. The motor mount assembly is operable for mounting the motor of the electric powered motorcycle so as to enable the motor to move relative to the frame of the motorcycle. The motor mount assembly includes a mount and means for pivotably securing the mount on the motorcycle. The mount which is generally rectangular in configuration embodies a planar portion from which a pair of side rails extend outwardly in spaced parallel relation therefrom at one end thereof. The planar portion is suitably dimensioned so as to be capable of receiving the motor thereon in fixed relation thereto. The free end of each of the side rails is affixed to one of the axles of the motorcycle whereby to be movable relative thereto. One of the side rails of the motor mount assembly intermediate the ends thereof is provided with a strap-like member having one end fastened thereto and which is operable as a retainer for the brake drum of the electric powered motorcycle. In addition, the aforereferenced one of the pair of side rails is also provided intermediate the ends thereof with an upstanding triangularly-shaped member having a screw threadedly engaged thereto adjacent the apex thereof. The latter triangularly-shaped member which has its base fastened to the side rail functions as a holder for one end of the brake cable with the screw being operable for adjustment purposes.

5 Claims, 8 Drawing Figures

MOTOR MOUNT FOR ELECTRIC POWERED MOTORCYCLE

BACKGROUND OF THE INVENTION

In recent years, there has developed a noticeable upward trend in the number of people who are devoting a significant amount of time to recreational pursuits of one type or another. One of these recreational pursuits is that of motorcycling. The extent of interest which exists in motorcycling is clearly shown by the rapidly increasing number of registrations of this type of motor vehicle. There are a variety of ways in which motorcycles are being used. Namely, some people employ motocycles merely as a recreational vehicle. Others are interested in participating in the various racing events for motorcycles which are held in large numbers particularly during the summer months in different portions of the country. In addition, many organizations which are involved in public safety such as police departments, etc. have purchased motorcycles for their own use as a means of assisting them to meet their assigned responsibilities. Finally, recently when the gasoline shortage became pronounced throughout this country, many people turned to motorcyles as an alternate mode of transportation to get to and from work, etc. because of the fact that motorcycles are noted for their economical fuel performance.

Concomitant with the rise in interest paid to motorcycles, there has been some attention given to making changes in the nature of the construction of the motorcycles. This has led to a proliferation of different types of motorcycles as well as the many different models of each type which are presently being marketed. As a result, the potential purchaser of a motorcycle has practically an unlimited selection to choose from. In addition to the so-called original equipment manufacturers who manufacture and sell motorcycles as complete units there also exists a number of other manufacturers who specialize in the manufacture of only different ones of the major components which are embodied in a motorcycle. The latter manufacturers offer their products to potential purchasers as components which can be substituted in the motorcycle for original equipment components provided therein. As a result of the availability of the latter type of products, a motorcycle owner by purchasing such equipment and embodying it in his motorcycle is capable often of changing almost completely the entire character of his motorcycle.

Notwithstanding the fact that some changes have been made in the construction of motorcycles here to date, by and large those changes have been in the nature of matters of appearance rather than in matter of structure. More specifically, apart from noticeable advances which have been made in recent years in the construction of motorcycle seats, little has changed heretofore in the basic design of motorcycles from a structural standpoint.

However, because of the continuing high price of gasoline and because internal-combustion engines are known to produce exhaust products that are deleterious to the environment, there has been some interest exhibited in providing a motorcycle which would be powered by some means other than an internal-combustion engine. In this regard, one such alternative power source for the conventional gasoline powered motorcycle is a motorcycle powered by electricity. To this end, there has now been produced and there is presently being commercially marketed an electric powered motorcycle. The latter derives it power from a multiplicity of rechargeable storage batteries.

Because of the need to support in such an electric powered motorcycle a multiplicity of storage batteries which are not embodied in a conventional motorcycle equipped with an internal-combustion engine, it has been found necessary to design the electric powered motorcycle so as to be capable of relocating therein some of the operating components thereof from the positions which these components have occupied in gasoline powered motorcycles. One such component which has needed to be relocated in the electric powered motorcycle is the motor. In a motorcycle which is powered by an internalcombustion engine, the latter commonly is supported on the frame at a point located approximately midway between the ends of the motorcycle. For this purpose, the frame is suitably configured so as to embody a horizontally extending portion on which the engine rests. The latter location was selected therefor based on a consideration of many factors. However, one important consideration in this regard revolves around the weight of the engine and the influence thereof on the stability of the motorcycle. More specifically, from the standpoint of both the static and the dynamic forces which are known to act on a motorcycle, it has been found that to prrovide the required stability thereto the engine of a gasoline powered motorcycle is most desirably located in the aforedescribed position.

In the electric powered motorcycle on the other hand, placement of the storage batteries because of their weight and size becomes important from the standpoint of ensuring the ability of providing a motorcycle which is stable. A further consideration in this regard is that space must be found on the motorcycle for the storage batteries which will not result in producing a motorcycle whose wheel base is significantly larger than the wheel base of the more conventional gasoline powered motorcycle. Based upon a consideration of the aforedescribed factors along with other factors not specifically referred to hereinabove, it has been found that the most suitable location for the storage batteries to be positioned in the electric powered motorcycle is approximately midway between the ends of the motorcycle, i.e., in substantially the same location occupied by the internal-combustion engine in a gasoline powered motorcycle. Consequently, a need has arisen to find another location in which to mount the electric motor which receives its power from the storage batteries and which in turn is operatively connected to the rear wheel of the motorcycle for purposes of imparting drive thereto. Commonly, the interconnection between the electric motor and the rear wheel is effected through some form of chain drive. However, the rear wheel is mounted on the motorcycle so as to be movable relative to the frame in order to minimize to shock received by the motorcycle as well as the operator thereof when the rear wheel hits a bump, etc. There therefore exists a need to provide some form of motor mount assembly for a electric powered motorcycle which will be effective to provide the driving interconnection between the electric motor and the rear wheel of the motorcycle while at the same time still enabling the rear wheel of the motorcycle to move relative to the frame of the motorcycle. More specifically, a need has been found to exist to provide a motor mount assembly which would be operable to enable the electric motor of the electric powered motorcycle to move whenever the rear wheel moves relative to the frame and to substantially the same extent whereby to cause the electric motor to continually bear the same relationship to the axle on which the rear wheel is mounted irrespective of the movement of the latter.

Accordingly, it is an object of the present invention to provide a novel and improved motor mount assembly which is particularly suited for employment in an electric powered motorcycle.

It is another object of the present invention to provide such a motor mount assembly which is operable for mounting an electric motor in an electric powered motorcycle so that the electric motor is capable of deriving its power from a multiplicity of storage batteries.

A further object of the present invention is to provide such a motor mount assembly which is operable for mounting an electric motor in an electric powered motorcycle so that the electric motor is drivingly connected to the rear wheel of the motorcycle.

A still further object of the present invention is to provide such a motor mount assembly which is operable for mounting an electric motor in an electric powered motorcycle so that the electric motor is movable relative to the frame of the motorcycle.

Yet another object of the present invention is to provide such a motor mount assembly for an electric powered motorcycle which is operable for mounting the electric motor thereof so that whenever the rear wheel moves relative to the frame of the motorcycle the electric motor is also caused to move whereby the electric motor will continually bear the same relationship with respect to the axle on which the rear wheel is mounted.

Yet still another object of the present invention is to provide such a motor mount assembly for an electric powered motorcycle which is relatively inexpensive to manufacture, is easy to assemble on a motorcycle, and is capable of effectively resisting the adverse environmental conditions to which the operating components of a motorcycle are commonly exposed.

SUMMARY OF THE INVENTION

It has now been found that the foregoing and related objects can be readily attained in a motor mount assembly which is particularly adapted for employment in an electric powered motorcycle for mounting the motor thereof thereon. The motor mount assembly is operable for mounting the electric motor in the electric powered motorcycle so that the motor is capable of deriving its power from a multiplicity of storage batteries with which the motorcycle is equipped. In addition, the motor mount assembly functions to mount the electric motor in the electric powered motorcycle so that the electric motor is capable of being drivingly connected to the rear wheel of the motorcycle. Most importantly, the motor mount assembly is operable for mounting the electric motor of an electric powered motorcycle so as to enable the motor to move relative to the frame of the motorcycle. The motor mount assembly includes a mount and means for pivotably securing the mount on the motorcycle. The mount is suitably configured so as to enable the electric motor to be rigidly affixed thereto adjacent one end thereof. The other end of the mount is secured to the axle of the motorcycle on which the rear wheel is mounted.

In accord with the preferred embodiment of the invention, the mount is generally rectangular in configuration and embodies a planar portion from which a pair of side rails extend outwardly in spaced parallel relation therefrom at one end thereof. The planar portion is suitable dimensioned so as to be capable of receiving the motor thereon in fixed relation thereto. The free end of each of the side rails is affixed to the rear axle of the motorcycle whereby to be pivotable thereabout. One of the side rails of the motor mount assembly intermediate the ends thereof is provided with a strap-like member having one end fastened thereto and which is operable as a retainer for the brake drum of the electric powered motorcycle. In addition, the afore-referenced one of the pair of side rails is also provided intermediate the ends thereof with an upstanding triangularlyshaped member having a screw threadedly engaged thereto adjacent the apex thereof. The latter triangularly-shaped member which has its base fastened to the side rail functions as a holder for one end of the brake cable with the screw being operable for purposes of making adjustments thereto.

DETAILED DESCRIPTION OF THE ILLUSTRATED EMBODIMENT

Figure 1:
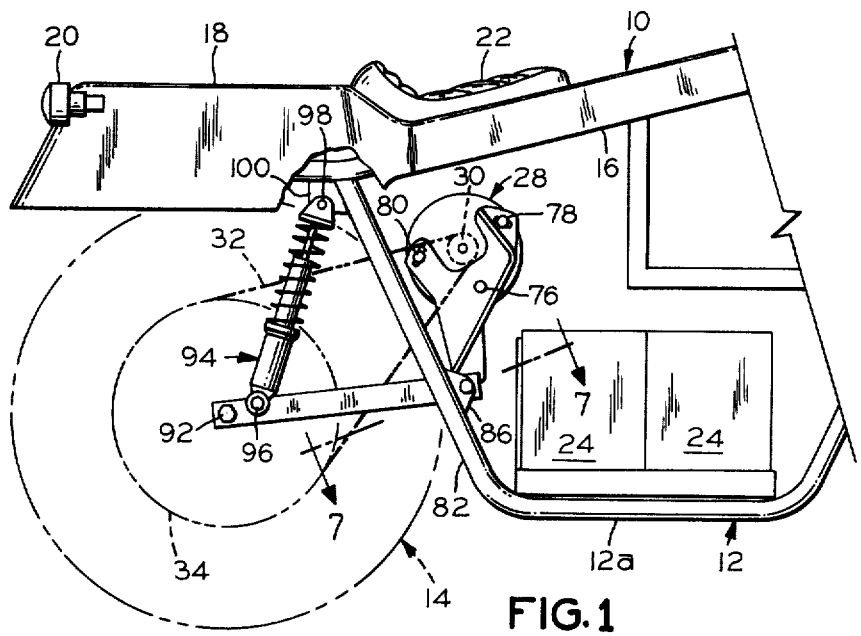
FIG. 1 is a side elevational view of a portion of an electric powered motorcycle embodying a motor mount assembly constructed in accordance with the present invention.

Referring now to the drawings and more particularly FIG. 1 thereof, there is illustrated therein a portion of an electric powered motorcycle generally designated by reference numeral 10. The motorcycle 10 includes a frame 12 and a pair of wheels, only one of which, i.e., the rear wheel 14 is illustrated in the drawings. The body 16 of the motorcycle 10 is supported on the frame 12 in a conventional manner which is well-known to those skilled in the art. The body 16 terminates at one end thereof in a rear fender portion 18 which functions to partially enclose the rear wheel 14. As shown in FIG. 1, the rear fender portion 18 also functions as a support for a tail light and/or directional signal light 20. The body 16 also intermediate the ends thereof functions as a support for a seat 22. The latter seat 22 obviously may be of differing size and/or configuration from that shown in FIG. 1 if so desired, as long as the seat 22 remains capable of being accommodated on the body 16.

The electric powered motorcycle 10 derives its power from a multiplicity of rechargeable storage batteries 24. The latter, as seen with reference to FIG. 1 of the drawings, are supported on a horizontally extending portion 12a of the frame 12. As will be readily understood by those skilled in the art, the batteries 24 in the eletric powered motorcycle 10 occupy the same position as does the internal-combustion engine in a conventional gasoline powered motorcycle. In this regard, it is important to note here the reason why the aforereferenced location has been selected for placement of the storage batteries 24. More specifically, as is well-known to those skilled in the art, in a motorcycle which is powered by an internal-combustion engine the latter commonly is supported on the frame at a point located approximately midway between the ends of the motorcycle. For this purpose, the frame is suitably configured so as to embody a horizontally extending portion on which the engine is supported. The latter location was selected therefor based on a consideration of many factors. One important consideration however in this regard involves the weight of the engine and the effect thereof on the stability of the motorcycle. From the standpoint of both the static and the dynamic forces which are known to act on a motorcycle, it has been found to provide the required stability thereto that the engine of a gasoline powered motorcycle is most desirably located in the aforedescribed position. On the other hand, in an electric powered motorcycle it is the placement of the storage batteries rather than the motor because of the weight and size of the former which becomes important from the stanpoint of ensuring the capability of providing an electric powered motorcycle which has stability. Also, consideration must be given to the fact that space must be found in the electric powered motorcycle for the storage batteries which will not result in producing a motorcycle which has a wheel base that is significantly larger than the wheel base of the more conventional gasoline powered motorcycle. Based upon the above along with some other secondary considerations not specially mentioned hereinabove, it has been found that the most suitable location for placement of the storage batteries in an electric powered motorcycle is approximately midway between the ends of the motorcycle, i.e, in substantially the same location as that occupied by the internal-combustion engine in a conventional gasoline powered motorcycle.

Since the components of the electric powered motorcycle 10 which have been described to this point hereinabove are only indirectly related to the subject matter of the present invention, futher description thereof herein is believed to be unnecessary.

The electric powered motorcycle 10 illustrated in FIG. 1 of the drawings embodies a motor mount assembly, generally designated by reference numeral 26, constructed in accordance with the presnet invention. As best understood with reference to FIG. 1 of the drawings, the motor mount assembly 26 functions as the means for mounting on the electric powered motorcycle 10 the electric motor 28 thereof. Although not shown in the drawings in the interest of maintaining clarity of illustration therein, it is to be understood that the electric motor 28 is connected in electrical circuit relation with the storage batteries 24 through suitable electrical conductor means (not shown) whereby the electric motor 28 receives its power from the storage batteries 24. The electric motor 28 in addition is operatively connected to the rear wheel 14 of the electric powered motorcycle 10 whereby to be capable of imparting drive thereto. To this end, the electric motor 28 has a relatively small sprocket 30 mounted for rotation relative thereto at one end thereof. The latter sprocket 30 in turn is connected by means of a chain 32 of suitable length to a relatively large sprocket 34 which is mounted on the rear axle (not shown) of the electric powered motorcycle 10. The aforedescribed small sprocket 30, chain 32 and large sprocket 34 constitute a chain drive assembly which is operable to transmit rotation of the small sprocket 30 therefrom through the chain 32 to the large sprocket 34 and therethrough to the rear axle (not shown) to which the large sprocket 34 is rigidly affixed causing the rear wheel 14 to rotate and thereby the electric powered motorcycle 10 to be driven.

Figure 2:
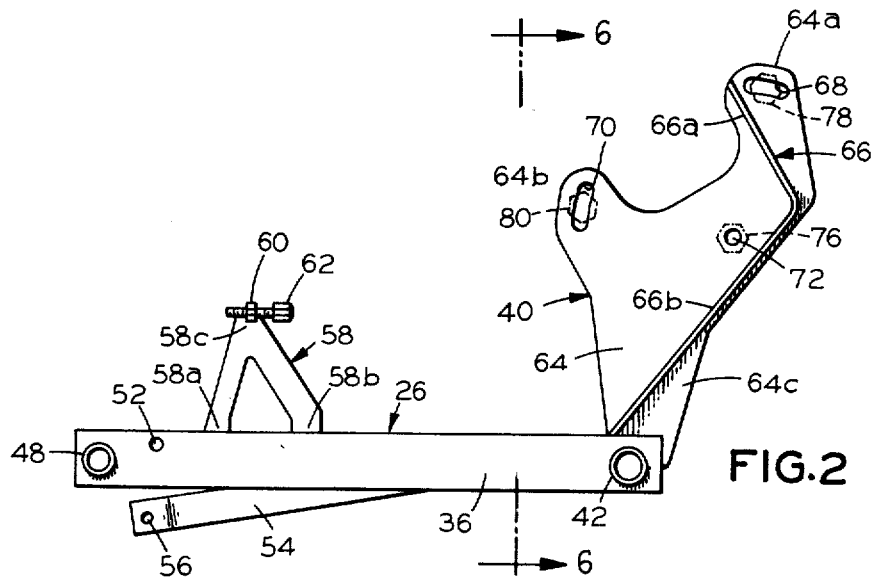
FIG. 2 is a side elevational view of a motor mount assembly for an electric powered motorcycle constructed in accordance with the present invention.
Figure 3:
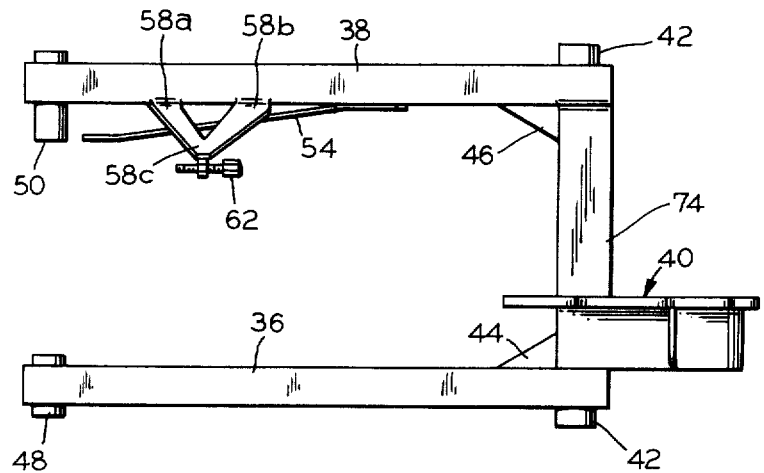
FIG. 3 is a top plan view of a motor mount assembly for an electric powered motorcycle constructed in accordance with the present invention.
Figure 6:
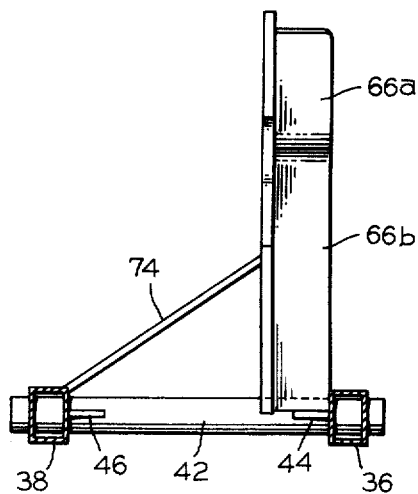
FIG. 6 is a cross sectional view of a motor mount assembly constructed in accordance with the present invention taken substantially along the line 6—6 in FIG. 2, illustrating the reinforcement means employed therein.

Turning next to a consideration of the nature of the construction of motor mount assembly 26, reference will be had for this purpose particularly to FIGS. 2 and 3 of the drawings. The motor mount assembly 26 in accord with the present invention includes a mount and means for securing the mount on the electric powered motorcycle 10. The mount which is generally rectangular in configuration includes a pair of side rails 36 and 38 and a generally planar member 40. Each of the side rails 36 and 38 in accord with the illustrated embodiment of the invention consists of an elongated tubular member, which as best understood with reference to FIG. 6 of the drawings, is substantially rectangular in cross section. Moreover, each of the side rails 36 and 38 have substantially identical lengths. Adjacent each end thereof, each of the side rails 36 and 38 is provided with a suitably dimensioned circular opening (not shown) formed completely therethrough. A length of pipe 42 is passed through the opening (not shown) provided therefor at one end of each of the side rails 36 and 38. The pipe 42 and the side rails 36 and 38 are secured together through the use of any suitable conventional means such as for example by welding, whereby the ends of the pipe 42 extend outwardly a short distance beyond the outer side wall surfaces of the side rails 36 and 38 for a purpose yet to be described. Moreover, it will be noted that the side rails 36 and 38 are secured on the pipe 42 so that the side rails 36 and 38 both extend outwardly in the same direction away from the pipe 42 and have their major axes extending substantially at right angles to the major axis of the pipe 42. In addition, the length of the pipe 42 is selected so as to have a preestablished dimension whereby when the side rails 36 and 38 each have one end thereof secured thereto the side rails 36 and 38 extend in parallel relation relative to each other and are spaced apart by a predetermined distance. As will be described more fully hereinafter, the planar member 40 also has one end thereof secured to the pipe 42 at a point intermediate the locations therealong whereat the side rails 36 and 38 are fastened thereto. With further reference to the pipe 42 and the side rails 36 and 38, in accord with the preferred embodiment of the motor mount assembly 26, gussets 44 and 46 are preferably employed for purposes of providing additional strength to the motor mount assembly 26, i.e., for purposes of reinforcing the joints formed between the pipe 42 and the side rails 36 and 38. As best understood with reference to FIGS. 3 and 6 of the drawings, the gusset 44 is employed at the joint between the pipe 42 and the side rail 36, and has one side thereof secured to the pipe 42 such as by being welded thereto and the other side thereof secured to the side rail 36 also such as by welding. Similarly, the gusset 46 is located at the joint between the pipe 42 and the side rail 38, and has one side thereof welded to the pipe 42 and the other side thereof welded to the side rail 38.

Figure 5:
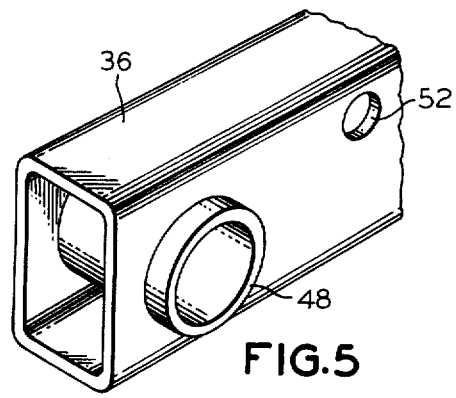
FIG. 5 is a perspective view of a portion of a motor mount assembly constructed in accordance with the present invention, illustrating on an enlarged scale the nature of the construction of the free end of one of the side rails of the motor mount assembly.

Continuing with the description of the motor mount assembly 26, as will be best understood with reference to FIG. 5 of the draiwings, the opening (not shown) formed in each of the side rails 36 and 38 adjacent the free end thereof has a bushing 48 and 50, respectively, received therein. In accord with the preferred embodiment of the invention, the bushings 48 and 50 are preferably welded in place within the aforereferenced openings (not shown). Moreover, as depicted in FIG. 3 of the drawings, the length of the bushings 48 and 50 is selected to be such that the bushings 48 and 50 extend outwardly of the side rails 36 and 38, respectively, on either side thereof. The function performed by the bushings 48 and 50 will be described subsequently in connection with a description of the manner in which the motor mount assembly 26 is mounted on the electric powered motorcycle 10. At this point it is deemed sufficient to merely note that another relatively small opening 52, only one of which is visible in the drawings, is formed in each of the side rails 36 and 38 adjacent to but spaced inwardly of the bushings 48 and 50, respectively. The openings 52 extend completely through the side rails 36 and 38, and are provided for a purpose yet to be described.

Referring again to FIGS. 2 ad 3 of the drawings, as illustrated therein one of the side rails, i.e., side rail 38 has preferably attached thereto a strap-like member 54. More specifically, the latter member 54 has one end thereof secured to the inner side wall surface of the side rail 38 through the use of any suitable conventional form of fastening means commonly employed to rigidly secure metal members together such as for example by means of welding. The free end of the member 54, as best understood with reference to FIG. 2 of the drawings, has an opening 56 formed therethrough located in spaced relation to the outer edge thereof. The member 54, in accord with the preferred embodiment of the invention, functions as a retainer for the brake drum (not shown) of the electric powered motorcycle 10. In this connection, the opening 56 formed in the member 54 is utilized for purposes of fastening the brake drum (not shown) to the member 54. The side rail 38 in addition is provided intermediate its ends with a triangularly-shaped member 58. The latter member 58, which more specifically has the appearance of an inverted V, has the ends of the two legs 58a and 58b thereof secured to the side rail 38 through the use of any suitable conventional form of fastening means such as for example by welding. At the apex 58c thereof, the member 58 is provided with an outwardly projecting lug 60 which has an internally threaded opening (not shown) formed therethrough. An adjustment screw 62 is threadedly engaged in the lug 60. In accord with the preferred embodiment of the invention, the screw 62 is interconnected to the brake cable (not shown) of the electric powered motorcycle 10 whereby through employment of the screw 62 adjustments may be made to the brake cable (not shown).

Turning now again to a consideration of the member 40, as was briefly mentioned hereinabove the member 40 is rigidly affixed to the pipe 42 at a point intermediate the locations whereat the side rails 36 and 38 are joined to the pipe 42. For this purpose, one end of the member 40 terminates in an arcuate-shaped recess (not shown) suitably dimensioned so as to conform to the circumference of the pipe 42 whereby the latter is capable of being received in the former. Preferably, the member 40 is secured to the pipe 42 by means of welding. The member 40 as best understood with reference to FIGS. 1, 2, 3 and 6 of the drawings consists of a planar portion 64 having an outwardly extending flange portion 66 provided on one side thereof. In accord with the illustrated embodiment of the invention, the planar portion 64 and the flange portion 66 are formed as two separate parts which are joined together such as by welding to produce the integral member 40.

As best understood with reference to FIG. 2 of the drawings, the planar portion 64 bears a resemblance generally to the letter Y, the latter configuration being produced by the two legs 64a and 64b of the planar portion 64 which diverge outwardly from the trunk portion 64c thereof. Adjacent the free ends thereof, each of the legs 64a and 64b of the planar portion 64 has formed therein an elongated slot 68 and 70 respectively. The function of the slots 68 and 70, which are each slightly arcuate in configuration, will be described more fully hereinafter in connection with a discussion of the manner in which the electric motor 28 is secured to the planar member 40. In this connection, it will further be noted that the planar portion 64 also has an opening 72 formed therein at a point spaced somewhat from the center of the planar portion 64, the function of which also will be described subsequently.

The flange portion 66, as best seen with reference to FIG. 2 of the drawings, is generally L-shaped in configuration. More specifically, the flange portion 66 includes a short leg 66a which is joined integrally with a longer leg 66b so that the major axes thereof extend substantially at right angles to each other. As depicted in the drawings, the short leg 66a of the flange portion 66 extends the length of and is fastened to the leg 64a of the planar portion 64 while the longer leg 66b of the flange portion 66 extends the length of and is fastened to the trunk portion 66c of the planar portion 64. To provide added rigidity to the planar member 40, the length of the leg 66b of the flange portion 66 is made sufficiently long so that the free end thereof is capable of being secured to the pipe 42 such as by being welded thereto. Moreover, in accord with the preferred embodiment of the invention, the planar member 40 is further reinforced through the use of a brace 74 which has one end thereof welded to the pipe 42 and the other end thereof welded to the side of the planar portion 64 opposite to that on which the flange portion 66 is located.

There will now be set forth a description of the manner in which the electric motor 28 is mounted on the motor mount assembly 26. As best understood with reference to FIGS. 1 and 2 of the drawings, the electric motor 28 is mounted on the planar member 40 with the sprocket 30 with which the electric motor 28 is provided being located in juxtaposed relation to the planar portion 64. In accord with the illustrated embodiment of the invention, three points of attachment are preferably employed between the electric motor 28 and the planar portion 64. More specifically, a first threaded fastener 76 is passed through the opening 72 in the planar portion 64 and into threaded engagement with the electric motor 28. In addition, a pair of threaded fasteners 78 and 80 are also passed through the slots 68 and 70, respectively, and into engagement with the electric motor 28. The above described mode of mounting the electric motor 28 on the planar member 40 is preferably employed inasmuch as it permits a rigid mounting to be had of the electric motor 28 on the planar portion 64 while at the same time enabling the position of the electric motor 28 relative to the planar portion 64 to be varied for purposes of making adjustments in the tension of the chain 32 which spans the sprockets 30 and 34. The latter adjustment is accomplished by loosening the fasteners 78 and 80 and if necessary the threaded fastener 76 to a sufficient extent to enable the electric motor 28 to pivot relative to the planar portion 64 about the fastener 76. As a result of this pivoting movement, the positions of the fasteners 78 and 80 in the slots 68 and 70, respectively, are caused to be varied which in turn is effective to change the distance by which the center line of the sprocket 30 and the center line of the sprocket 34 are spaced apart, and thereby the amount of tension on the chain 32.

Figure 4:
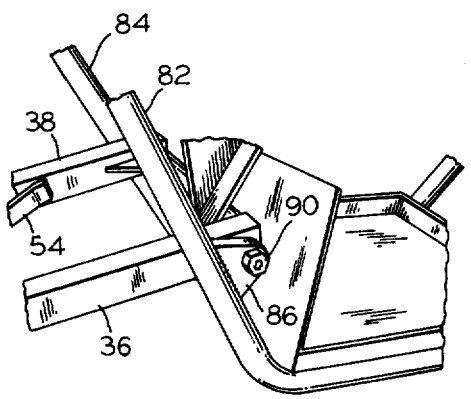
FIG. 4 is a perspective view of a portion of a motor mount assembly constructed in accordance with the present invention, illustrating the manner in which one end of the motor mount assembly is pivotably mounted on an electric powered motorcycle.
Figure 7:
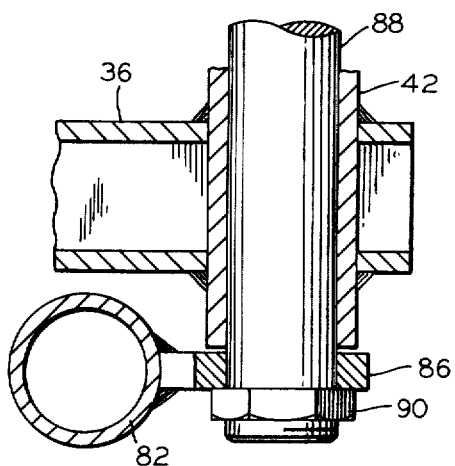
FIG. 7 is a cross sectional view of a motor mount assembly constructed in accordance with the present invention mounted on an electric powered motorcycle taken substantially along the line 7—7 in FIG. 1, illustrating the manner in which the interconnection between one end of the motor mount assembly and the electric powered motorcycle is accomplished.

The manner in which the motor mount assembly 26 of the present invention is embodied in the electric powered motorcycle 10 will now be set forth. Referring for this purpose particularly to FIGS. 1, 4 and 7 of the drawings, as shown therein the motor mount assembly 26 has one end thereof pivotably mounted on the frame 12 of the electric powered motorcycle 10 and the other end thereof operatively connected to the rear axle (not shown) of the motorcycle 10. Considering first the manner in which one end of the motor mount assembly 26 is pivotably mounted on the frame 12, the latter in accord with the illustrated embodiment thereof includes a pair of upwardly and rearwardly extending frame members 82 and 84. The latter frame members 82 and 84 are spaced apart by a distance corresponding to the length of the pipe 42 whereby the motor mount assembly 26 is capable of being interposed therebetween. In addition, each of the frame members 82 and 84 is provided intermediate its ends with a triangularly-shaped projection 86, only one of which is visible in the drawings. The projections 86 are preferably affixed to the frame members 82 and 84 by being welded thereto. Also, the projections 86 are each provided at a point spaced inwardly from the apex thereof with a suitably dimensioned opening (not shown). As illustrated in FIG. 7 of the drawings, a solid rod 88 is positioned within the pipe 42 whereby to extend the length thereof. Furthermore, the rod 88 is suitably dimensioned so as to be capable of being inserted through the openings (not shown) provided for this purpose in each of the projections 86. It should thus be readily apparent from the above description that the rod 88 in addition to providing added strength to the motor mount assembly 26 also functions as the axis about which the motor mount assembly 26 pivots relative to the frame 12. For purposes of fastening the rod 88 and thereby one end of the motor mount assembly 26 to the projections 86 and thus to the frame members 82 and 84 of the frame 12, each end of the rod 88 is preferably provided with threads for at least a portion of the length thereof. A suitable nut 90 and if desired a suitable washer (not shown) is received on each end of the rod 88 outwardly of the projections 86 and in threaded engagement with the threads formed on the ends of the rod 88 whereby the rod 88 and therefore one end of the motor mount assembly 26 is secured to the projections 86 between the frame members 82 and 84.

Insofar as concerns the other end of the motor mount assembly 26, the latter as referred to previously is attached to the rear axle (not shown) of the electric powered motorcycle 10. More specifically, the rear axle (not shown) of the motorcycle 10 extends through the bushings 48 and 50 which, as described previously hereinabove, are supported on the side rails 36 and 38, respectively, in fixed relation thereto. For purposes of maintaining the side rails 36 and 38 positioned on the rear axle (not shown) of the electric powered motorcycle 10, the rear axle (not shown) may have threads formed thereon at each end thereof for at least a portion of the length thereof. In turn, a suitably dimensioned nut 92, only one of which is visible in the drawings, and if so desired a suitable washer (not shown) may be positioned on the rear axle (not shown) outwardly of the side rails 36 and 38 and in threaded engagement therewith.

Referring further to FIG. 1 of the drawings, as shown therein there also exists another interconnection between the side rails 36 and 38 of the motor mount assembly 26 and the frame 12 of the electric powered motorcycle 10. In this regard, reference is had to the fact that the electric powered motorcycle 10 is provided with a pair of shock absorbers 94 of conventional design, only one of which is visible in the drawings, which are connected at one end to the motor assembly 26 and at the other end to the frame 12 of the motorcycle 10. More specifically, the pair of shock absorbers 94 each have one end thereof fastened to a corresponding one of the side rails 36 and 38. Namely, some form of conventional threaded fastener 96 is passed through the opening 52 formed in the corresponding one of the side rails 36 and 38, and also through a similar opening (not shown) provided for this purpose at one end of each of the shock absorbers 94. In a somwhat similar manner, the other end of each of the pair of shock absorbers 94 is connected to the frame 12. For this purpose, the shock absorbers 94 at the other end thereof are each provided with another suitably configured opening (not shown) capable of receiving therein a threaded fastener 98. The latter fastener 98 is also passed through a suitably dimensioned opening (not shown) provided for this purpose in a projection 100, only one of which is visible in the drawings, with which each of the frame members 82 and 84 of the frame 12 is provided. Some form of locking means (not shown) such as a conventional internally threaded nut may be threadedly engaged on one threaded end of the fasteners 96 and 98 after the latter in the manner described above have been passed through the side rails 36, 38 and one end of the shock absorbers 94, and the other end of the shock absorbers 94 and the projections 100, respectively, whereby to effect a secure connection therebetween.

Figure 8:
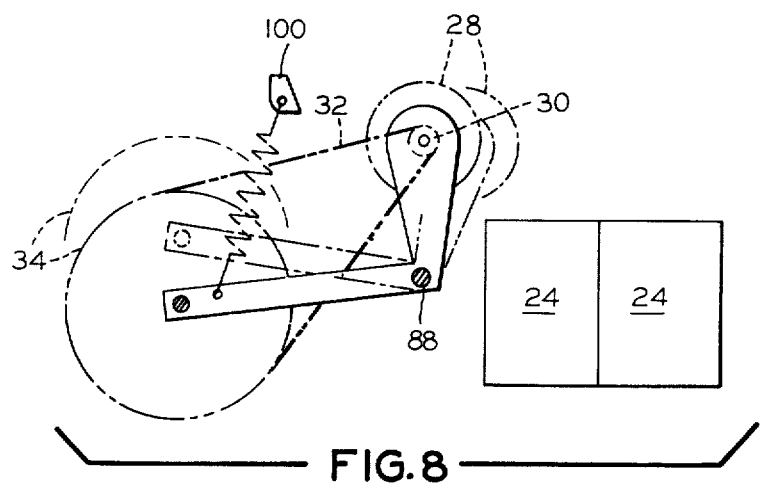
FIG. 8 is a schematic diagram of a portion of an electric powered motorcycle embodying a motor mount assembly constructed in accordance with the present invention, illustrating the manner in which the motor mount assembly is capable of pivoting relative to the frame of the electric powered motorcycle.

As best understood with reference to FIG. 8 of the drawings, by virtue of the aforedescribed mode of mounting the motor mount assembly 26 in the electric powered motorcycle 10, the electric motor 28 is not only capable of being connected in electrical circuit relation with the storage batteries 24 so as to derive its power therefrom but also of being operatively connected to the rear axle of the motorcycle 10 so as to impart drive thereto, but also the electric motor 28 is mounted so as to be movable relative to the frame 12. More specifically, the motor mount assembly 26 when so embodied in the electric powered motorcycle 10 enables the electric motor 28 to move whenever the rear wheel 14 moves relative to the frame 12 of the motorcycle 10 upon hitting a bump, etc. as permitted by the shock absorbers 94, and to move substantially to the same extent as the rear wheel 14 whereby the same relationship is continually maintained between the electric motor 28 and the rear axle on which the rear wheel 14 of the motorcycle 10 is mounted, the maintenance of the latter relationship being required in order to ensure that the chain drive assembly consisting of the sprockets 30 and 34 and the chain 32 functions properly.

Although only one embodiment of a motor mount assembly constructed in accordance with the present invention has been shown in the drawings and described hereinabove, it is nevertheless to be understood that modifications in the construction thereof may be made thereto by those skilled in the art without departing from the essence of the invention. In this connection, some of the modifications which can be made in the motor mount assembly have been alluded to hereinabove while others will become readily apparent to those skilled in the art when exposed to the present description and illustration of the construction of the motor mount assembly 26. For example, although one specific method of mounting the electric motor 28 on the planar portion 64 has been illustrated in the drawings and described hereinabove, it is to be understood that other means could be utilized for accomplishing this function without departing from the essence of the invention. Moreover, the flange portion 66 supported on one side of the planar portion 64 which has one end thereof rigidly affixed to the pipe 42 whereby to provide added rigidity to the upstanding planar portion 64 and also functions in the nature of a chain guard for the chain 32 as the latter passes around the sprocket 30 could obviously take some other form without departing from the essence of the invention. In addition, as described hereinabove and illustrated in the drawings the shock absorbers 94 which have one end thereof connected to the side rails 36 and 38 at a point spaced inwardly of the bushings 48 and 50, respectively, in which the rear axle is supported could be mounted in some other manner. In this regard, it should be understood that if so desired the aforereferenced connection between one end of the shock absorbers 94 and the side rails 36 and 38 could be effected by operatively connecting the aforesaid one end of the shock absorbers 94 to the rear axle after the latter has been inserted through the bushings 48 and 50. Also, although the side rails 36 and 38 in accord with the illustrated embodiment of the invention comprise tubular members having a rectangular cross section, the side rails 36 and 38 could obviously embody some other form of configuration as long as the side rails 36 and 38 continue to possess the necessary structural strength required thereby, without departing from the essence of the invention.

Thus, it can be seen that the present invention provides a novel and improved motor mount assembly which is particularly suited for employment in an electric powered motorcycle. Moreover, in accord with the present invention a motor mount assembly is provided which is operable for mounting an electric motor in an electric powered motorcycle so that the electric motor is capable of deriving its power from a multiplicity of storage batteries. The motor mount assembly of the present invention is operable for mounting an electric motor in an electric powered motorcycle so that the electric motor is drivingly connected to the rear wheel of the motorcycle. Furthermore, in accord with the present invention a motor mount assembly is provided which is operable for mounting an electric motor in an electric powered motorcycle so that the electric motor is movable relative to the frame of the motorcycle. Also, a motor mount assembly for an electric powered motorcycle has been provided which is operable for mounting the electric motor thereof so that whenever the rear wheel moves relative to the frame by virtue of hitting a bump, etc. the electric motor is also caused to move whereby the electric motor wwill continually bear the same relationship with respect to the axle on which the rear wheel is mounted. Finally, in accord with the present invention a motor mount assembly for an electric powered motorcycle has been provided which is relatively inexpensive to manufacture, easy to assemble on the motorcycle, and is capable of effectively resisting the adverse environmental conditions to which the operating components of a motorcycle are commonly exposed.

Hàving thus described the invention, I claim:

1. In an electric powered motorcycle having a frame including a pair of spaced frame members, storage batteries supported on the frame operable for powering the motorcycle, a front wheel, a rear wheel supported on a rear axle, and shock absorber means having one end connected to the frame and the other end operatively connected to the rear wheel and operable for enabling the rear wheel to move relative to the frame in passing over an obstruction in the path of movement thereof, the improvement comprising a motor mount assembly operable for mounting the electric motor of the electric powered motorcycle thereon for movement relative to the frame while the electric motor remains connected in electrical circuit relation with the storage batteries from which the electric motor receives its power and also remains operatively connected to the rear wheel for imparting drive thereto and thereby to the motorcycle, said motor mount assembly comprising:

a. a motor mount having one end thereof pivotably mounted on the frame of the motorcycle and the other end thereof supported on the rear axle of the motorcycle, said motor mount including a pair of side rails, a planar member and connecting means operable for interconnecting said side rails and said planar member for movement together as a unit, said pair of side rails comprising a pair of elongated members having one end thereof rigidly affixed to said connecting means in spaced relation relative to each other with said pair of elongated members extending in parallel relation to each other and with the major axis of each of said pair of elongated members extending at right angles to the major axis of said connecting means, each of said pair of elongated members being tubular in configuration and having a rectangular cross section, each of said pair of elongated members further including means formed thereon intermediate the ends thereof for attaching one end of the shock absorber means thereto, said connecting means comprising a piece of pipe having a length substantially equal to the spacing between the pair of frame members, said planar member including means for mounting the electric motor thereon, said planar member having one end thereof rigidly affixed to said connecting means intermediate and spaced from the point of attachment of said pair of elongated members to said connecting means with the major axis of said planar member extending at right angles to the major axis of said connecting means, said planar member consisting of a planar portion and a flange portion supported on one side of said planar portion, said planar portion and said flange portion each having one end thereof rigidly affixed to said piece of piping; and means securing said motor mount on the motorcycle to cause said motor mount whenever the rear wheel moves relative to the frame to move correspondingly, said securing means including a first member having said connecting means supported thereon, said first member comprising a solid rod positioned in said piece of pipe and having threads formed at each end thereof, means fastening one end of said first member to one of the pair of frame members and the other end of said first member to the other of the pair of frame members, and bushing means supported on said pair of elongated members adjacent the other end thereof operable for receiving the rear axle therewithin for movement relative thereto.

2. In an electric powered motorcycle, the improvement of a motor mount assembly as set forth in claim 1 further comprising a brace having one end thereof rigidly secured to said planar member and the other end thereof rigidly secured to said piece of pipe to provide said planar member with additional rigidity.

3. In an electric powered motorcycle, the improvement of a motor mount assembly as set forth in claim 1 further comprising gusset means operable to strengthen said motor mount, said gusset means including a first gusset having one side rigidly secured to one of said pair of elongated members and the other side thereof rigidly secured to said piece of pipe and a second gusset having one side thereof rigidly secured to the other of said pair of elongated members and the other side thereof rigidly secured to said piece of pipe.

4. In an electric powered motorcycle, the improvement of a motor mount assembly as set forth in claim 1 wherein said means for mounting the electric motor on said planar member includes adjustment means operable for adjusting the position of the electric motor on said planar member.

5. In an electric powered motorcycle, the improvement of a motor mount assembly as set forth in claim 1 wherein said bushing means consists of a first bushing supported on one of said pair of elongated members and a second bushing supported on the other of said pair of elongated members.

* * * * *